(12) United States Patent
Chen et al.

(10) Patent No.: US 9,306,479 B2
(45) Date of Patent: Apr. 5, 2016

(54) VARIABLE SPEED FAN MOTOR

(71) Applicant: Zhongshan Broad-Ocean Motor Co., Ltd., Zhongshan (CN)

(72) Inventors: Yunsheng Chen, Zhongshan (CN); Yong Zhao, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 391 days.

(21) Appl. No.: 13/844,966

(22) Filed: Mar. 16, 2013

(65) Prior Publication Data

US 2014/0097775 A1    Apr. 10, 2014

(30) Foreign Application Priority Data

Oct. 10, 2012  (CN) .......................... 2012 2 0516592

(51) Int. Cl.
| | |
|---|---|
| *H02P 6/06* | (2006.01) |
| *H02K 11/00* | (2006.01) |
| *H02P 6/00* | (2006.01) |
| *H02P 21/00* | (2006.01) |

(52) U.S. Cl.
CPC ............ *H02P 6/002* (2013.01); *H02P 21/0035* (2013.01)

(58) Field of Classification Search
CPC .......................... H02M 7/217; H04M 1/7253
USPC .......................................... 318/701; 454/228
See application file for complete search history.

(56) References Cited

U.S. PATENT DOCUMENTS

| | | | | |
|---|---|---|---|---|
| 5,497,289 | A  * | 3/1996 | Sugishima et al. | 361/709 |
| 8,724,313 | B2 * | 5/2014 | Nakasaka et al. | 361/679.46 |
| 8,853,900 | B2 * | 10/2014 | Zeng et al. | 310/68 R |
| 2010/0025126 | A1 * | 2/2010 | Nakatsu et al. | 180/65.1 |
| 2011/0260671 | A1 * | 10/2011 | Jeung | 318/701 |
| 2012/0009863 | A1 * | 1/2012 | Sun et al. | 454/228 |

* cited by examiner

*Primary Examiner* — Eduardo Colon Santana
*Assistant Examiner* — Devon Joseph
(74) *Attorney, Agent, or Firm* — Matthias Scholl, PC; Matthias Scholl (57) ABSTRACT

A variable speed fan motor, including: a variable speed motor and a motor controller. The motor controller includes a microprocessor, an inverter circuit, a gear detection circuit, and a power supply unit. The gear detection circuit includes a plurality of Hall current sensing units. Each second power input line is connected with a first input end of each of the Hall current sensing units. Second input ends of the Hall current sensing units are connected in parallel, and are connected with a second AC input end of the power supply unit. An output end of the Hall current sensing unit is connected with an input end of the microprocessor. The microprocessor selects operating parameters according to an energized signal of the second power input lines and controls the variable speed motor to operate in accordance with the selected operating parameters.

20 Claims, 6 Drawing Sheets

VARIABLE SPEED FAN MOTOR

CROSS-REFERENCE TO RELATED APPLICATIONS

Pursuant to 35 U.S.C. §119 and the Paris Convention Treaty, this application claims the benefit of Chinese Patent Application No. 201220516592.9 filed Oct. 10, 2012, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a variable speed fan motor which is mainly used in civil heating and ventilation air-conditioning (HVAC) systems.

2. Description of the Related Art

A typical variable speed fan motor in a HVAC system employs a fixed-speed or multi-speed permanent-split capacitor (PSC) motor which includes at least two independent power connectors to demodulate a heating or cooling mode of operation. A power input end of the heating or cooling is usually connected to different winding taps of the PSC motor, which provides different operating speeds for fans in different operational modes. Thus, such PSC motors have low efficiency.

Due to the low efficiency of the PSC motors, many updated HVAC systems employs variable speed motors such as brushless permanent-magnet motors (BPM) and corresponding variable speed motors with electronic controllers. The rotational speed of BPM can be controlled by electronic components, which is particularly set to produce required air flows matching with each application. In addition, the power consumption of BMP is approximately in direct proportion to a cube of a rotational speed of the motor, and the electrical work of the PSC motor is approximately in direct proportion to the rotational speed of the motor. Thus, when the motor speed drops, the electrical work of BPM within the whole scope of motor speed is lower than that of BPM. This is especially important when the fan runs continuously and repeatedly.

The BPM employed in the HVAC system has the advantages of variable speed motors but doesn't change the original HVAC system obviously; it lowers the complexity of the HVAC system by using simple control circuits and cancels additional arrangements of wires which are usually used in connecting the regular variable speed motors and the existing alternative variable speed motors. However, the existing variable speed fan controllers which are used to replace PSC motors have the following defects:

1) Current transformers and related circuits are applied in detecting the status of each power input line. The applied current transformers have defects of big size, high cost, severe electromagnetic interference, large space occupation in motor controllers, bad heat dissipation of motor controllers and difficult wiring and installation procedures.
2) A plurality of sensing units of current transformers are imbedded in the connecting plug of the motor, which is difficult in installation, low in production efficiency, and disadvantageous for mass production.

SUMMARY OF THE INVENTION

In view of the above-described problems, it is one objective of the invention to provide a variable speed fan motor. The gear detection circuit of the invention employs a plurality of Hall current sensing units to detect the electric connection of the second power input line. The utility has advantages of being small in size, being convenient in wiring, having low cost, having good heat dissipation, having simple lay and being convenient for mass production.

To achieve the above objective, in accordance with one embodiment of the invention, there is provided a variable speed fan motor, comprising: a variable speed motor; and a motor controller. The motor controller comprises: a microprocessor, an inverter circuit, a gear detection circuit comprising a plurality of Hall current sensing units, and a power supply unit. An output end of the power supply unit supplies electric power for each circuit. A first AC input end of the power supply unit is connected with a first power input line. The gear detection circuit is connected with a plurality of second power input lines. One of the second power input lines is selected to be powered on; the others are powered off. Each of the second power input lines is connected with a first input end of each of the Hall current sensing units. Second input ends of the Hall current sensing units are in parallel connection, and are connected with a second AC input end of the power supply unit. An output end of the Hall current sensing unit is connected with an input end of the microprocessor. The microprocessor selects operating parameters according to an energized signal of the second power input lines, and controls the variable speed motor to operate in accordance with the selected operating parameters.

In a class of this embodiment, the operating parameters of the motor are rotational speed parameters; a power-on state of each second power input line matches with a rotational speed.

In a class of this embodiment, the operating parameters of the motor are torque parameters; a power-on state of each second power input line matches with a torque.

In a class of this embodiment, the operating parameters of the motor are air volume parameters; a power-on state of each second power input line matches with an air volume.

In a class of this embodiment, the microprocessor is connected with a Hall element. The Hall element sends a signal of a rotor position to the microprocessor. The microprocessor outputs a signal to control the inverter circuit. An output end of the inverter circuit is connected with a motor winding.

In a class of this embodiment, five second power input lines are provided; and five Hall current sensing units are provided.

In a class of this embodiment, three second power input lines are provided; and three Hall current sensing units are provided.

In a class of this embodiment, the microprocessor, the inverter circuit, the gear detection circuit, and the power supply unit are all integrated on a circuit board. The circuit board is disposed on a control box.

Advantages of the invention are summarized as follows:

1) The gear detection circuit employs a plurality of the Hall current sensing units to detect the energizing state of each second power input line. Thus, the invention has a small size, lower cost, good property in heat dissipation, simple layout, is convenient for wiring and mass production.
2) A plurality of the Hall current sensing units, the microprocessor, the invert circuit, and the power supply unit are integrated on one or two circuit boards, thereby being convenient for mass production.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a variable speed fan motor are described below. It should be noted that the following examples are intended to describe and not to limit the invention.

Example 1

Figure 1:
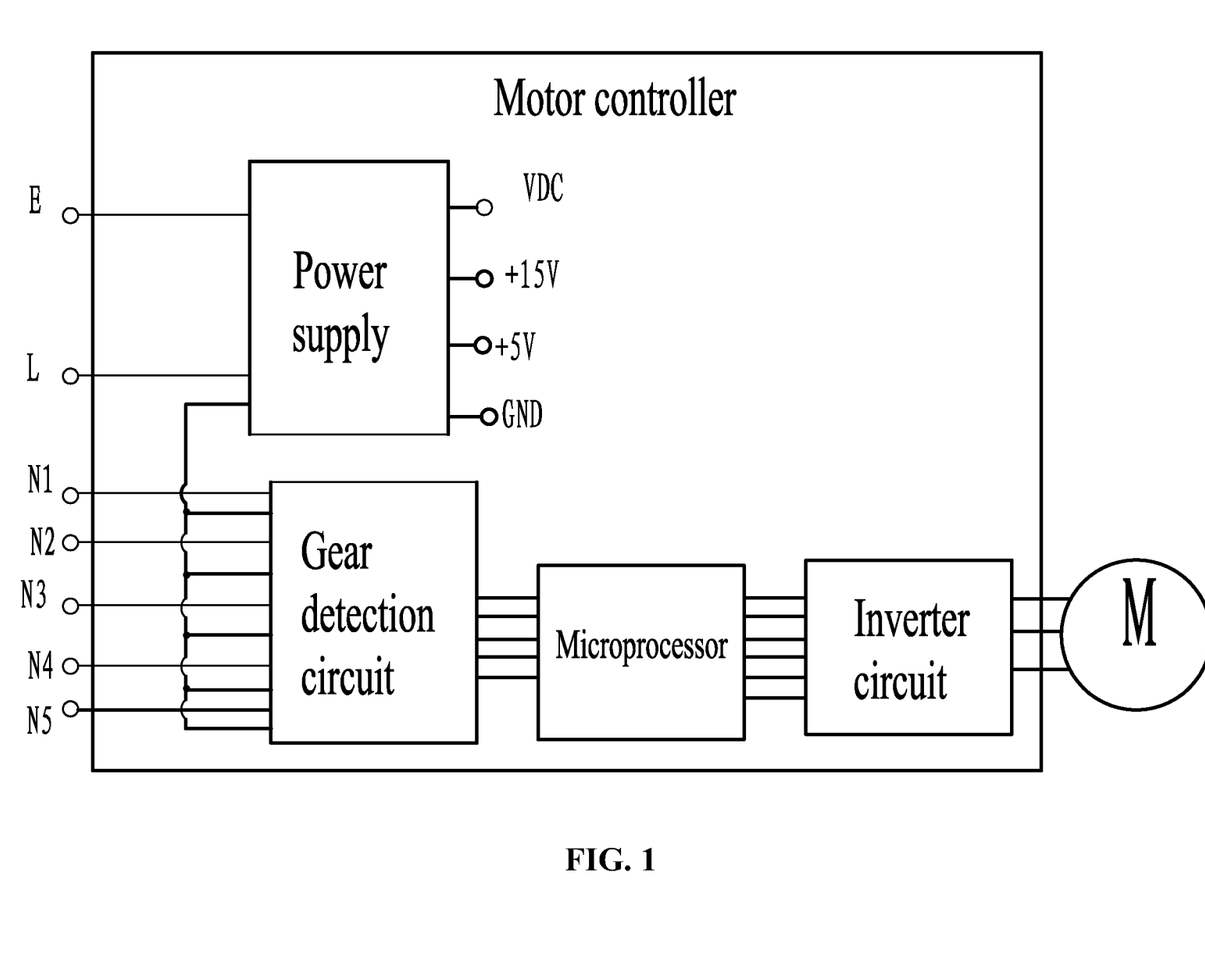
FIG. 1 is a schematic circuit diagram of a variable speed fan motor in accordance with one embodiment of the invention.
Figure 2:
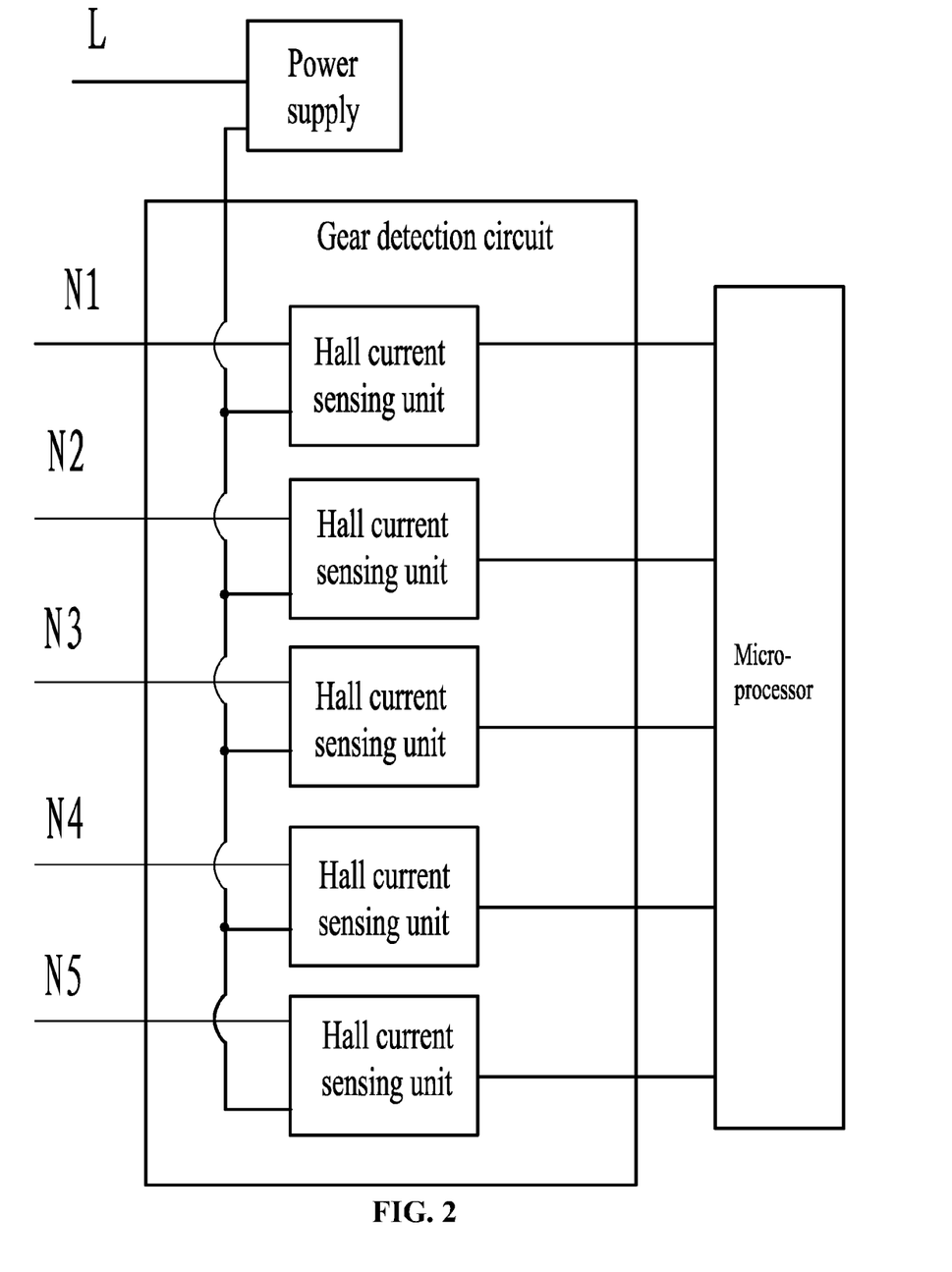
FIG. 2 is a block diagram of a gear detection circuit of FIG. 1.
Figure 3:
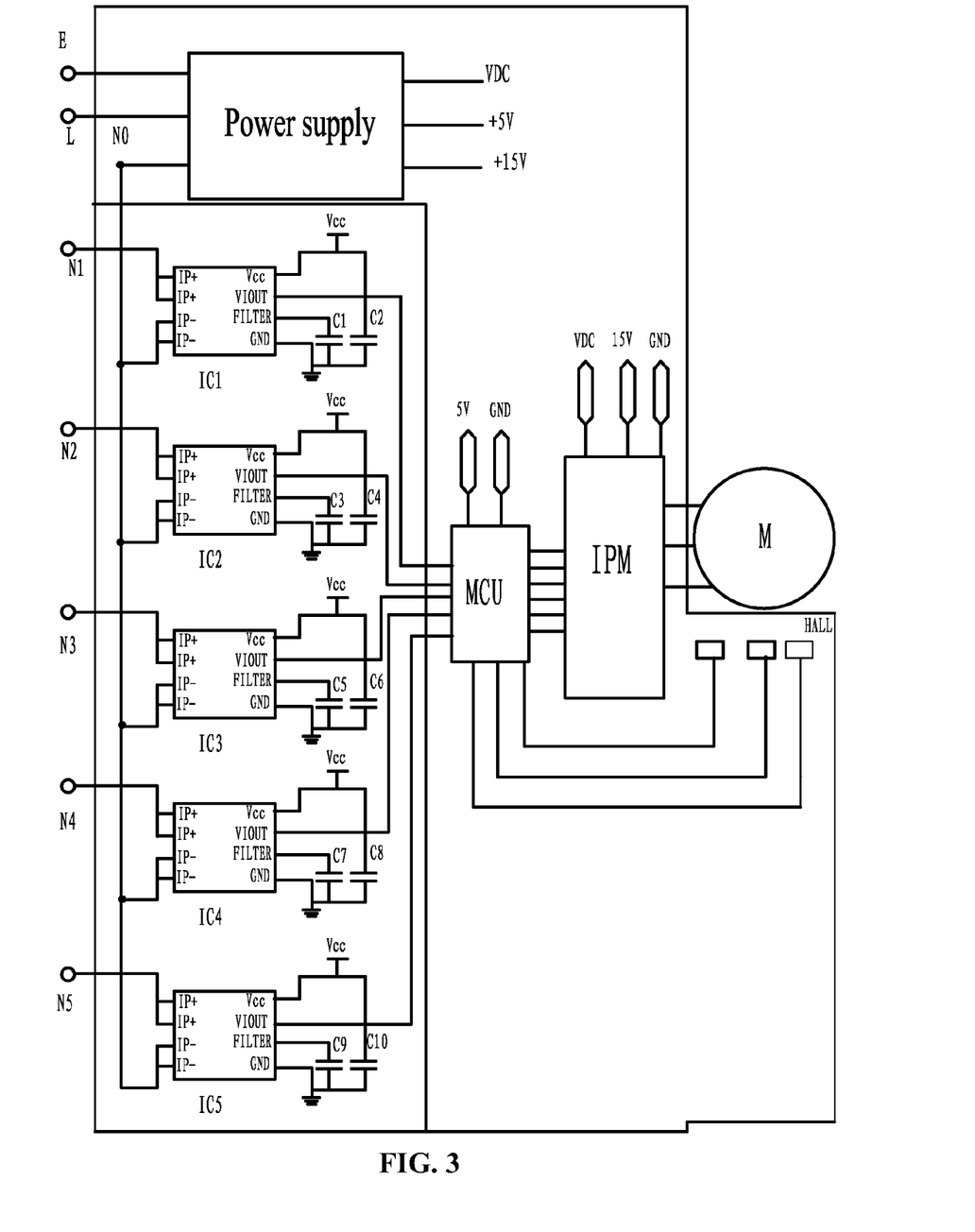
FIG. 3 is a specific circuit diagram of FIG. 1.
Figure 4:
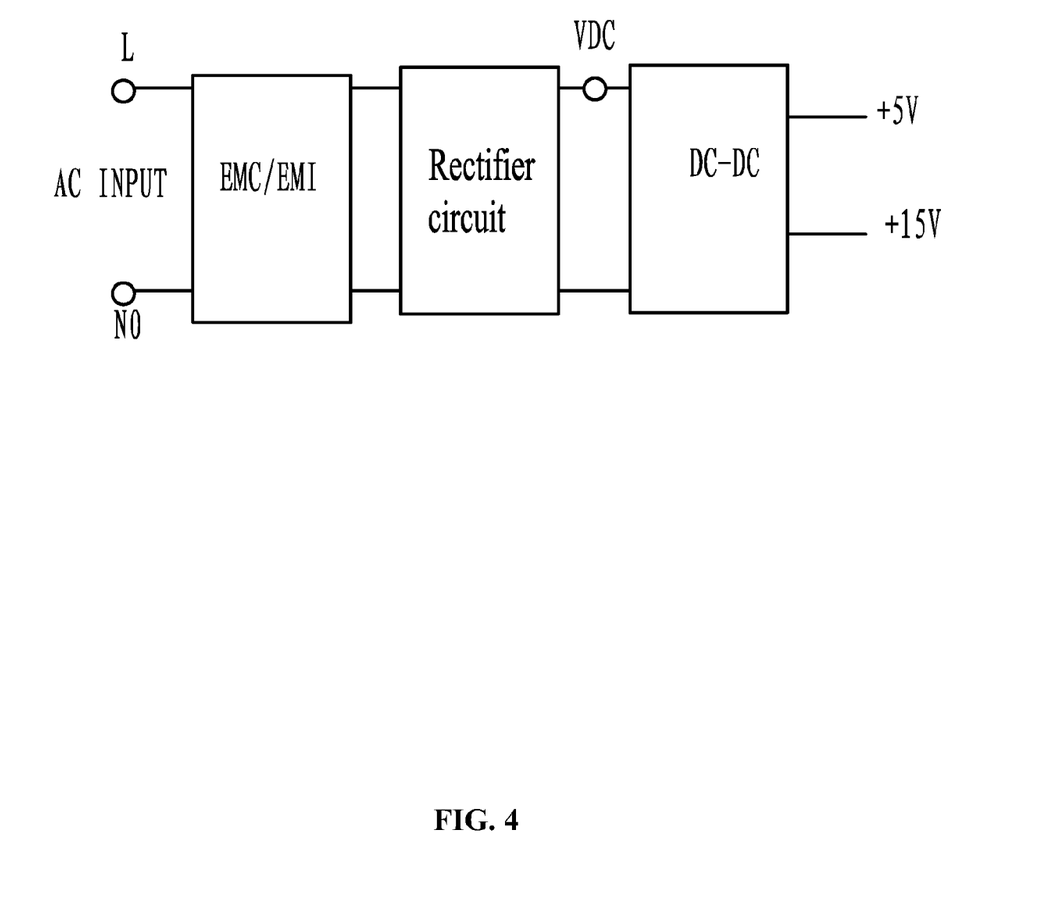
FIG. 4 is a circuit diagram of a power supply unit in accordance with one embodiment of the invention.

As shown in FIGS. 1-4, a variable speed fan motor comprises: a variable speed motor M, and a motor controller. The motor controller comprises: a microprocessor, an inverter circuit, a gear detection circuit, and a power supply unit. An output end of the power supply unit supplies electric power for each circuit. The microprocessor employs a micro controller unit (MCU). The inverter circuit employs an integrated power module (IPM). M represents the variable speed motor in FIGS. 1-4. As shown in FIG. 4, the power supply unit comprises: an EMI or EMC anti-electromagnetic interference circuit, a rectifier circuit, and a DC-DC transformation circuit. An output bus comprises voltages of VDC and +15V and +5V supplies electric power for each circuit. The microprocessor is also connected with a Hall element. The Hall element sends a signal of a rotor position to the microprocessor. The microprocessor outputs a signal to control the inverter circuit. An output end of the inverter circuit is connected with a motor winding. Operating parameters of the motor are rotational speed parameters, a power-on state of each second power input line matches with a rotational speed; or operating parameters of the motor are torque parameters, a power-on state of each second power input line matches with a torque; or operating parameters of the motor are air volume parameters, a power-on state of each second power input line matches with an air volume.

A first AC input end of the power supply unit is connected with a first power input line L. The power supply unit is also connected with an earth wire E. The gear detection circuit is connected to a plurality of second power input lines N1, N2, N3, N4, and N5. One of the second power input lines N1, N2, N3, N4, and N5 is chosen to be on a power-on state; the others are on a power-off state. The gear detection circuit comprises a plurality of Hall current sensing units as shown in FIG. 3:

A first Hall current sensing unit comprises: a chip IC1, a capacitor C1 and a capacitor C2. Two IP+ input pins of the chip IC1 are in parallel to form the first input end which is connected with the second power input line N1. Two IP− input pins of the chip IC1 are in parallel to form the second input end which is connected with the second AC input end N0 of the power supply unit. The output pin VIOUT of the chip IC1 is connected with the microprocessor.

A second Hall current sensing unit comprises: a chip IC2, a capacitor C3, and a capacitor C4. Two IP+ input pins of the chip IC2 are in parallel to form the first input end which is connected with the second power input line N2. Two IP− input pins of the chip IC2 are in parallel to form the second input end which is connected with the second AC input end N0 of the power supply unit. The output pin VIOUT of the chip IC2 is connected with the microprocessor.

A third Hall current sensing unit comprises: a chip IC3, a capacitor C5, and a capacitor C6. Two IP+ input pins of the chip IC3 are in parallel to form the first input end which is connected with the second power input line N3. Two IP− input pins of the chip IC3 are in parallel to form the second input end which is connected with the second AC input end N0 of the power supply unit. The output pin VIOUT of the chip IC3 is connected with the microprocessor.

A fourth Hall current sensing unit comprises: a chip IC4, a capacitor C7, and a capacitor C8. Two IP+ input pins of the chip IC4 are in parallel to form the first input end which is connected with the second power input line N4. Two IP− input pins of the chip IC4 are in parallel to form the second input end which is connected with the second AC input end N0 of the power supply unit. The output pin VIOUT of the chip IC4 is connected with the microprocessor.

A fifth Hall current sensing unit comprises: a chip IC5, a capacitor C9, and a capacitor C10. Two IP+ input pins of the chip IC5 are in parallel to form the first input end which is connected with the second power input line N5. Two IP− input pins of the chip IC5 are in parallel to form the second input end which is connected with the second AC input end N0 of the power supply unit. The output pin VIOUT of the chip IC5 is connected with the microprocessor.

Working principle of the variable speed fan motor: one of the second power input lines N1, N2, N3, N4 and N5 is chosen to be on a power-on state; the others are chosen to be on a power-off state. If the second power input line N1 is power on, the second power input line N2, N3, N4 and N5 are powered off. The second power input line N1 and the first power input line L form an AC input loop which is connected with two IP+ input pins and two IP− input pins of the first Hall current sensing unit as well as the second AC input end N0. The output pin VIOUT of the chip IC1 of the first Hall current sensing unit is connected with the microprocessor. The microprocessor chooses the operating parameters of the motor and controls the motor to operate in accordance with the operating parameters.

Figure 5:
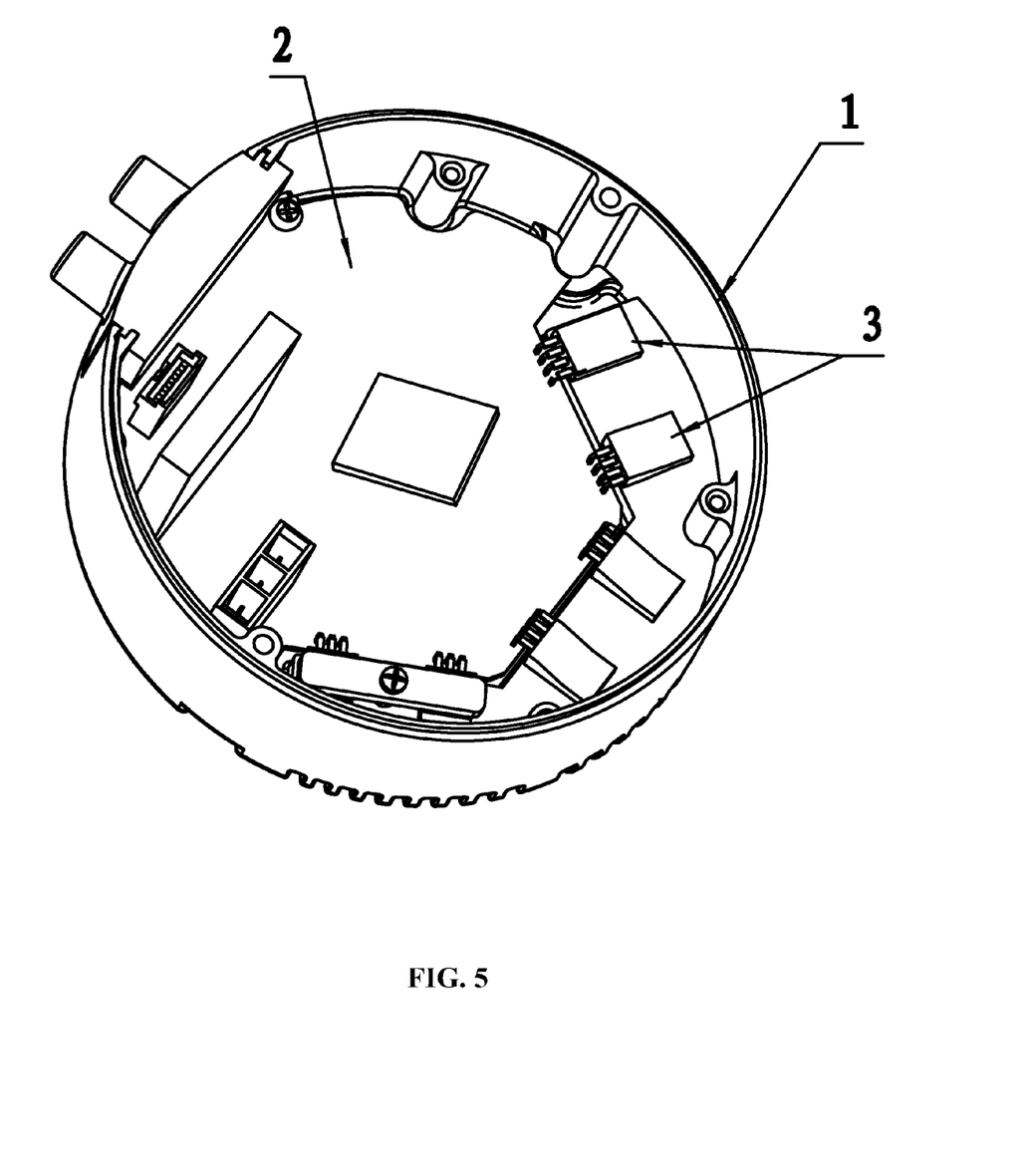
FIG. 5 is a stereogram of a motor controller in accordance with one embodiment of the invention.
Figure 6:
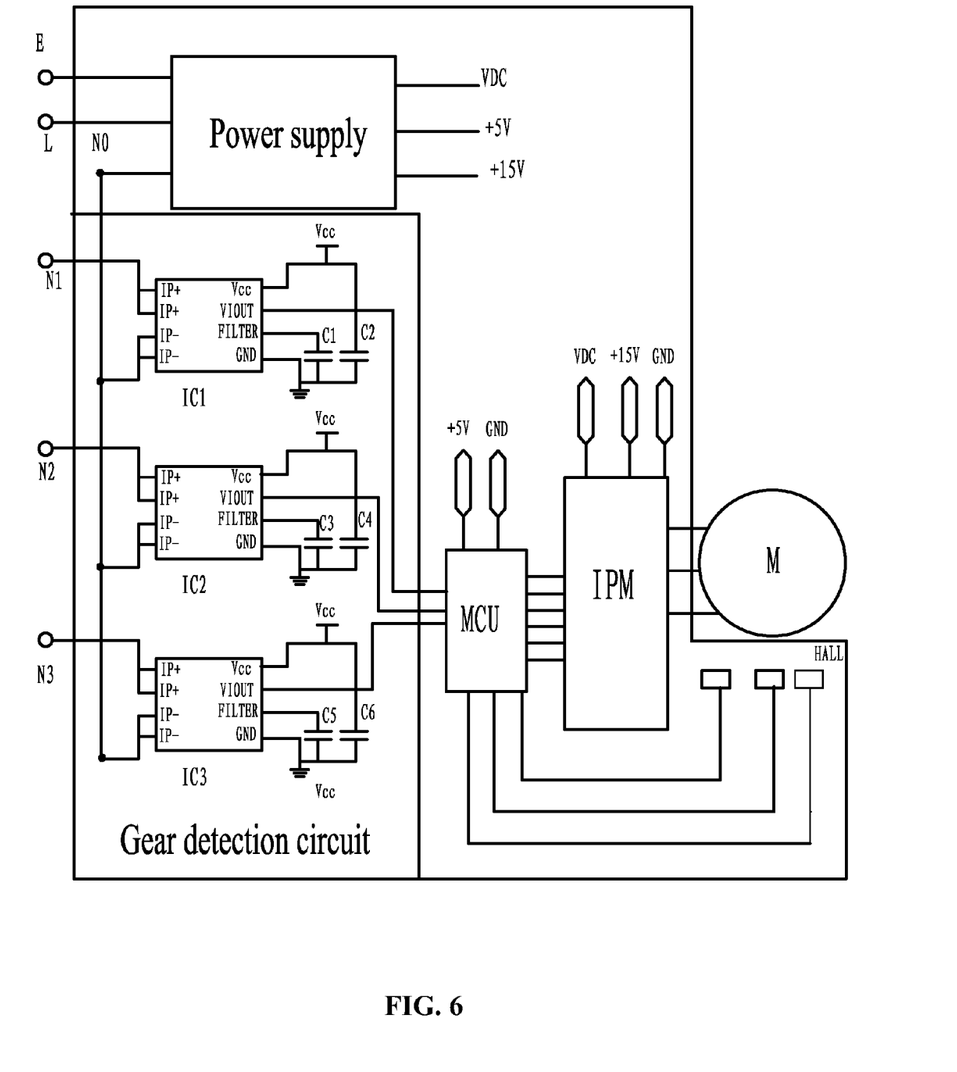
FIG. 6 is a circuit diagram in accordance with one embodiment of the invention.

As shown in FIG. 5, the motor controller comprises: a control box 1, and a circuit board 2 arranged inside the control box. The Hall current sensing unit 3 is integrated on the circuit board 2. The motor control of the invention has a small size, lower cost, good property in heat dissipation, simple layout, is convenient for wiring and mass production. A plurality of the Hall current sensing units, the microprocessor, the invert circuit and the power supply unit are integrated on one or two circuit boards so as to be convenient for mass production.

Example 2

A variable speed fan motor comprises: a variable speed motor M, and a motor controller. The motor controller comprises: a microprocessor, an inverter circuit, a gear detection circuit, and a power supply unit. An output end of the power supply unit supplies electric power for each circuit. The microprocessor employs a micro controller unit (MCU). The inverter circuit employs an integrated power module (IPM). M represents the variable speed motor in FIGS. 1-4. The microprocessor is also connected with a Hall element. The Hall element sends a signal of a rotor position to the microprocessor. The microprocessor outputs a signal to control the inverter circuit. An output end of the inverter circuit is connected with a motor winding. Operating parameters of the motor are rotational speed parameters, a power-on state of each second power input line matches with a rotational speed; or operating parameters of the motor are torque parameters, a power-on state of each second power input line matches with a torque; or operating parameters of the motor are air volume parameters, a power-on state of each second power input line matches with an air volume.

A first AC input end of the power supply unit is connected with a first power input line L. The power supply unit is also connected with an earth wire E. The gear detection circuit is connected to a plurality of second power input lines N1, N2, and N3. One of the second power input lines N1, N2, and N3 is chosen to be on a power-on state; the others are on a power-off state. The gear detection circuit comprises a plurality of Hall current sensing units.

A first Hall current sensing unit comprises: a chip IC1, a capacitor C1, and a capacitor C2. Two IP+ input pins of the chip IC1 are in parallel to form the first input end which is connected with the second power input line N1. Two IP− input pins of the chip IC1 are in parallel to form the second input end which is connected with the second AC input end N0 of the power supply unit. The output pin VIOUT of the chip IC1 is connected with the microprocessor.

A second Hall current sensing unit comprises: a chip IC2, a capacitor C3, and a capacitor C4. Two IP+ input pins of the chip IC2 are in parallel to form the first input end which is connected with the second power input line N2. Two IP− input pins of the chip IC2 are in parallel to form the second input end which is connected with the second AC input end N0 of the power supply unit. The output pin VIOUT of the chip IC2 is connected with the microprocessor.

A third Hall current sensing unit comprises: a chip IC3, a capacitor C5, and a capacitor C6. Two IP+ input pins of the chip IC3 are in parallel to form the first input end which is connected with the second power input line N3. Two IP− input pins of the chip IC3 are in parallel to form the second input end which is connected with the second AC input end N0 of the power supply unit. The output pin VIOUT of the chip IC3 is connected with the microprocessor.

Working principle of the variable speed fan motor is as follows: one of the second power input lines N1, N2 and N3 is chosen to be on a power-on state; the others are chosen to be on a power-off state. If the second power input line N2 is power on, the second power input line N1 and N3 are powered off. The second power input line N2 and the first power input line L form an AC input loop which is connected with two IP+ input pins and two IP− input pins of the second Hall current sensing unit as well as the second AC input end N0. The output pin VIOUT of the chip IC2 of the second Hall current sensing unit is connected with the microprocessor. The microprocessor chooses the operating parameters of the motor and controls the motor to operate in accordance with the operating parameters.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A variable speed fan motor, comprising:
a) a variable speed motor; and
b) a motor controller, the motor controller comprising: a microprocessor, an inverter circuit, a signal detection circuit comprising a plurality of Hall current sensing units, and a DC power supply unit;

wherein:
the DC power supply unit is adapted to convert AC current into DC current and output the DC current;
a first AC input end of the DC power supply unit is connected with a first power input line;
the signal detection circuit is connected with a plurality of second power input lines;
one of the second power input lines is selected to be powered on; the others are powered off;
each of the second power input lines is connected with a first input end of one of the Hall current sensing units;
second input ends of the Hall current sensing units are in parallel connection, and are connected with a second AC input end of the DC power supply unit;
an output end of each Hall current sensing unit is connected with an input end of the microprocessor;
the microprocessor is adapted to select operating parameters according to an energized signal of the second power input lines, and is adapted to control the variable speed motor to operate in accordance with the selected operating parameters;
the DC power supply unit comprises an anti-electromagnetic interference circuit, a rectifier circuit, and a DC-DC transformation circuit;
the anti-electromagnetic interference circuit, the rectifier circuit, and the DC-DC transformation circuit are sequentially connected in series;
the first AC input end of the DC power supply unit and the second AC input end of the DC power supply unit are directly connected with the anti-electromagnetic interference circuit; and
the DC-DC transformation circuit is adapted to output at least two DC voltages.

2. The variable speed fan motor of claim 1, wherein
the operating parameters of the motor are rotational speed parameters; and
a power-on state of each second power input line matches with a rotational speed.

3. The variable speed fan motor of claim 1, wherein
the operating parameters of the motor are torque parameters; and
a power-on state of each second power input line matches with a torque.

4. The variable speed fan motor of claim 1, wherein
the operating parameters of the motor are air volume parameters; and
a power-on state of each second power input line matches with an air volume.

5. The variable speed fan motor of claim 1, wherein
the microprocessor is connected with a Hall element;
the Hall element sends a signal of a rotor position to the microprocessor;
the microprocessor outputs a signal to control the inverter circuit; and
an output end of the inverter circuit is connected with a motor winding.

6. The variable speed fan motor of claim 2, wherein
the microprocessor is connected with a Hall element;
the Hall element sends a signal of a rotor position to the microprocessor;

the microprocessor outputs a signal to control the inverter circuit; and an output end of the inverter circuit is connected with a motor winding.

7. The variable speed fan motor of claim 3, wherein
the microprocessor is connected with a Hall element;
the Hall element sends a signal of a rotor position to the microprocessor;
the microprocessor outputs a signal to control the inverter circuit; and
an output end of the inverter circuit is connected with a motor winding.

8. The variable speed fan motor of claim 4, wherein
the microprocessor is connected with a Hall element;
the Hall element sends a signal of a rotor position to the microprocessor;
the microprocessor outputs a signal to control the inverter circuit; and
an output end of the inverter circuit is connected with a motor winding.

9. The variable speed fan motor of claim 1, wherein five second power input lines are provided; and five Hall current sensing units are provided.

10. The variable speed fan motor of claim 2, wherein five second power input lines are provided; and five Hall current sensing units are provided.

11. The variable speed fan motor of claim 3, wherein five second power input lines are provided; and five Hall current sensing units are provided.

12. The variable speed fan motor of claim 4, wherein five second power input lines are provided; and five Hall current sensing units are provided.

13. The variable speed fan motor of claim 1, wherein three second power input lines are provided; and three Hall current sensing units are provided.

14. The variable speed fan motor of claim 2, wherein three second power input lines are provided; and three Hall current sensing units are provided.

15. The variable speed fan motor of claim 3, wherein three second power input lines are provided; and three Hall current sensing units are provided.

16. The variable speed fan motor of claim 4, wherein three second power input lines are provided; and three Hall current sensing units are provided.

17. The variable speed fan motor of claim 1, wherein:
the microprocessor, the inverter circuit, the signal detection circuit, and the DC power supply unit are all integrated on a circuit board; and
the circuit board is disposed on a control box.

18. The variable speed fan motor of claim 2, wherein:
the microprocessor, the inverter circuit, the signal detection circuit, and the DC power supply unit are all integrated on a circuit board; and
the circuit board is disposed on a control box.

19. The variable speed fan motor of claim 3, wherein:
the microprocessor, the inverter circuit, the signal detection circuit, and the DC power supply unit are all integrated on a circuit board; and
the circuit board is disposed on a control box.

20. The variable speed fan motor of claim 4, wherein:
the microprocessor, the inverter circuit, the signal detection circuit, and the DC power supply unit are all integrated on a circuit board; and
the circuit board is disposed on a control box.

\* \* \* \* \*